Dec. 9, 1924.  
E. C. COFFMAN  
AUTOMOBILE LOCK  
Filed Jan. 22, 1923
1,519,086
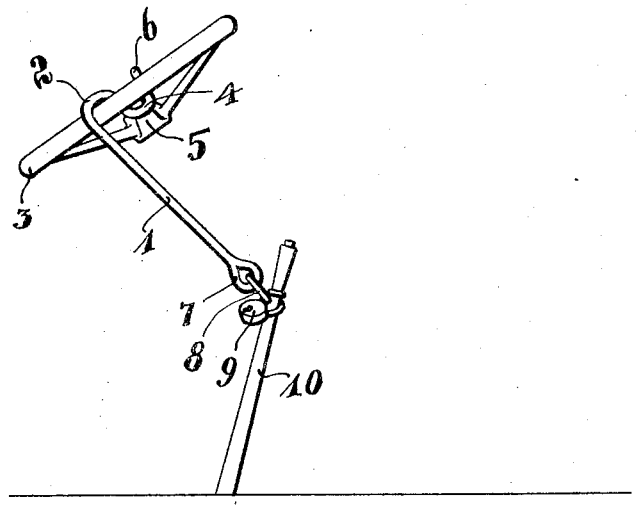
INVENTOR:  
EDGAR C. COFFMAN,  
By: Otto H. Krueger,  
his Atty.

Patented Dec. 9, 1924.

1,519,086

UNITED STATES PATENT OFFICE.

EDGAR C. COFFMAN, OF EL MONTE, CALIFORNIA.

AUTOMOBILE LOCK.

Application filed January 22, 1923. Serial No. 614,192.

*To all whom it may concern:*

Be it known that I, EDGAR C. COFFMAN, a citizen of the United States, residing at El Monte, in the county of Los Angeles and State of California, have invented a new and useful Automobile Lock, of which the following is a specification.

This invention relates to devices for locking an automobile for the purpose of preventing theft.

One of the objects of this invention is to provide a simple device that can easily be applied to an automobile without any changes to the automobile.

Another object is to provide a device by which the steering wheel and brake of a vehicle are interlocked.

Another object is to provide a device especially suitable for Ford automobiles, by reason of the fact that it prevents a gear shifting by interlocking the brake-lever with the steering wheel.

Another object is to provide an inexpensive device that can easily be used in conjunction with any kind of a lock.

Other objects will appear from the following description and appended claims as well as from the accompanying drawing, in which—

The figure is a side elevation of a simple device, illustrated in proper relation to the steering wheel and brake-lever of an automoblie, embodying the invention.

The emergency brake-lever is on most of the models of automobiles in approximately the position in relation to the steering wheel as illustrated in the drawing.

Many models of automobiles have the gear-shift lever in a similar position. Locking the gear-shift lever is obviously the most correct feat, and apparently in compliance with most of the laws governing the parking of cars, since allowing a slight moving of cars in case of fire near the place where a car is parked.

The bar 1, in the drawing, is provided with the hook-like portion 2, to engage over the rim 3 of a steering wheel. Another hook-like portion 4, in continuation of the first hook like portion 2, serves to engage over one of the spokes or arms 5 of the steering wheel from below. The termination 6 of the device is extended far enough upwardly to prevent a disengaging of the device from the steering wheel while the bar 1 is properly locked or in its proper engaging position.

The lower end of the bar 1 is provided with a loop-like termination 7, allowing an engaging of this end to a proper place or part of a vehicle. In the drawing, a ring or additional link 8 is illustrated, connected by the lock 9 to the lever 10. The device may in this manner be made to be applicable to different types or models of vehicles.

Making the bar 1 of a form and length to fit for locking purposes on or with a certain model of automobile, additional rings or links, provided on the loop-end 7, serve to make the same device applicable to other models of automobiles.

The link 8 may easily be provided with different perforations or engaging portions to make the device applicable for different models of cars.

The loop-end 7, also can easily be of uneven form, instead of one even loop, to allow an applying of a lock at different points lengthwise from the hook-end, as will easily be understood without further illustration or description.

Having thus described my invention, I claim:

1. In an automobile lock, a bar having a double hook-like portion to engage in opposite direction over and under the rim and one of the arms of the steering wheel of an automobile so as to prevent a moving of the bar in longitudinal direction and having means for locking the bar to a suitable part of the automobile.

2. In an automobile lock, a bar having an S-like hook-end to engage over the rim and under one of the arms of the steering wheel of an automobile and having means for removably locking the bar to a suitable place of the automobile for locking the steering wheel against turning.

3. In an automobile lock, a bar of a length to reach from the steering wheel to an operating lever of an automobile terminating at one end in a hook-like portion to engage over the rim and under the one arm of the said steering wheel and terminating at the opposite end in a loop-like portion to allow an insertion of a pad-lock for locking the steering wheel to the said operating lever.

In testimony that I claim the foregoing as my invention I have signed my name in the presence of two subscribing witnesses.

EDGAR C. COFFMAN.

Witnesses:
O. H. KRUEGER,
JESSIE A. MANOCK.